United States Patent
Jurasek

(10) Patent No.: US 8,106,702 B2
(45) Date of Patent: Jan. 31, 2012

(54) DYNAMIC ENABLING PUMP FOR POWER CONTROL

(75) Inventor: Ryan Andrew Jurasek, S. Burlington, VT (US)

(73) Assignee: Nanya Technology Corp., Kueishan, Tao-Yuan Hsien (TW)

( * ) Notice: Subject to any disclaimer, the term of this patent is extended or adjusted under 35 U.S.C. 154(b) by 137 days.

(21) Appl. No.: 12/603,572

(22) Filed: Oct. 21, 2009

(65) Prior Publication Data

US 2011/0089999 A1   Apr. 21, 2011

(51) Int. Cl.
*G05F 1/10* (2006.01)
*G05F 3/02* (2006.01)

(52) U.S. Cl. ........... 327/536; 327/535; 327/537; 363/60

(58) Field of Classification Search ............ 327/148, 327/157, 534–537; 363/59, 60
See application file for complete search history.

(56) References Cited

U.S. PATENT DOCUMENTS

| | | | |
|---|---|---|---|
| 5,706,230 A * | 1/1998 | Lee | 365/189.11 |
| 5,920,226 A * | 7/1999 | Mimura | 327/537 |
| 7,057,866 B2 * | 6/2006 | Hsu et al. | 361/18 |
| 7,180,794 B2 * | 2/2007 | Matsue | 365/189.09 |
| 2003/0034825 A1 * | 2/2003 | Hsu et al. | 327/530 |
| 2005/0063231 A1 * | 3/2005 | Matsue | 365/202 |
| 2006/0082409 A1 * | 4/2006 | Kobayashi et al. | 327/536 |
| 2009/0184239 A1 * | 7/2009 | Jeong et al. | 250/214 R |
| 2009/0219081 A1 * | 9/2009 | Kwon et al. | 327/536 |

* cited by examiner

*Primary Examiner* — Lincoln Donovan
*Assistant Examiner* — Brandon S Cole
(74) *Attorney, Agent, or Firm* — Wintson Hsu; Scott Margo

(57) ABSTRACT

A voltage generation system that can dynamically calibrate a time period for enabling the system includes: a voltage generation circuit, for providing an output voltage; an oscillator, coupled to the voltage generation circuit, for driving the voltage generation circuit to generate the output voltage at a specific frequency according to an enable signal; a limiter, coupled to the oscillator and the output voltage fed back from the voltage generation circuit, for generating the enable signal to the oscillator according to the output voltage; and an enable controller, coupled to the limiter, the oscillator, the voltage generation circuit and the enable signal generated by the limiter, for enabling the limiter, the oscillator and the voltage generation circuit according to an estimated time between enable signals, wherein the estimated time is dynamically calibrated.

7 Claims, 3 Drawing Sheets

ID_PUMP FOR POWER CONTROL

DYNAMIC ENABLING PUMP FOR POWER CONTROL

BACKGROUND OF THE INVENTION

1. Field of the Invention

The present invention relates to a pump circuit, and more particularly, to a pump circuit that can dynamically control a time at which a pump is enabled.

2. Description of the Prior Art

Standard pump circuits consist of a pump, for producing an output voltage; an oscillator, for driving the pump to operate at a certain periodicity; and a limiter, for enabling the oscillator according to the output voltage which is fed back from the pump. When the output voltage becomes too low, the limiter will enable the oscillator to drive the pump. When the output voltage becomes too high, the limiter will disable the oscillator, allowing the output voltage to be reduced once more.

In order for this system to operate correctly, the limiter must be enabled all the time. For certain systems and in certain modes, such as low current modes, this is unnecessary. Instead, a system tries to guess at what time the pump will need to pump, and enables the limiter for these time periods only. This saves power. For an illustration of this kind of system please refer to FIG. 1.

FIG. 1 is a diagram of a conventional pump system 100 that employs an enable controller 140, for enabling the limiter 110. A feedback signal from the pump 130 is input to both the limiter 110 and the enable controller 140. The enable controller 140 then uses this feedback signal as a means of determining when to enable the limiter 110. The enable controller 140 will have a timer built in, and uses a period between the pump output as a means for determining the next time the pump 130 will pump. Such a system, however, is subject to inaccuracies. In many operation modes, the current demand and response time is hard to predict. Furthermore, the output of this system will resemble a sawtooth, as the pump 130 is operational and then bleeds down when it disables. During the bleeding down time, as an output voltage is still generated by the pump 130, the limiter 110 is still enabled and is wasting power.

It is therefore a purpose of the present invention to provide a pump system that can more accurately predict a time at which the limiter needs to be enabled, and can therefore save power.

SUMMARY OF THE INVENTION

A voltage generation system that can dynamically calibrate a time period for enabling the system according to an exemplary embodiment of the present invention includes: a voltage generation circuit, for providing an output voltage; an oscillator, coupled to the voltage generation circuit, for driving the voltage generation circuit to generate the output voltage at a specific frequency according to an enable signal; a limiter, coupled to the oscillator and the output voltage fed back from the voltage generation circuit, for generating the enable signal to the oscillator according to the output voltage; and an enable controller, coupled to the limiter, the oscillator, the voltage generation circuit and the enable signal generated by the limiter, for enabling the limiter, the oscillator and the voltage generation circuit according to an estimated time between enable signals, wherein the estimated time is dynamically calibrated.

A method for dynamically calibrating a time period for enabling a voltage generation system comprises: generating an output voltage; periodically generating a first enable signal for driving the output voltage at a specific frequency according to a feedback signal of the output voltage; outputting the first enable signal according to a second enable signal; generating the second enable signal according to an estimated time period between periodic generations of the first enable signal; and dynamically calibrating the estimated time period each time the first enable signal is output.

These and other objectives of the present invention will no doubt become obvious to those of ordinary skill in the art after reading the following detailed description of the preferred embodiment that is illustrated in the various figures and drawings.

DETAILED DESCRIPTION

The present invention is a pump system that also utilizes an enable controller, but the enable controller utilizes the internal timer to calibrate an estimated time at which the limiter needs to be enabled.

Figure 1:
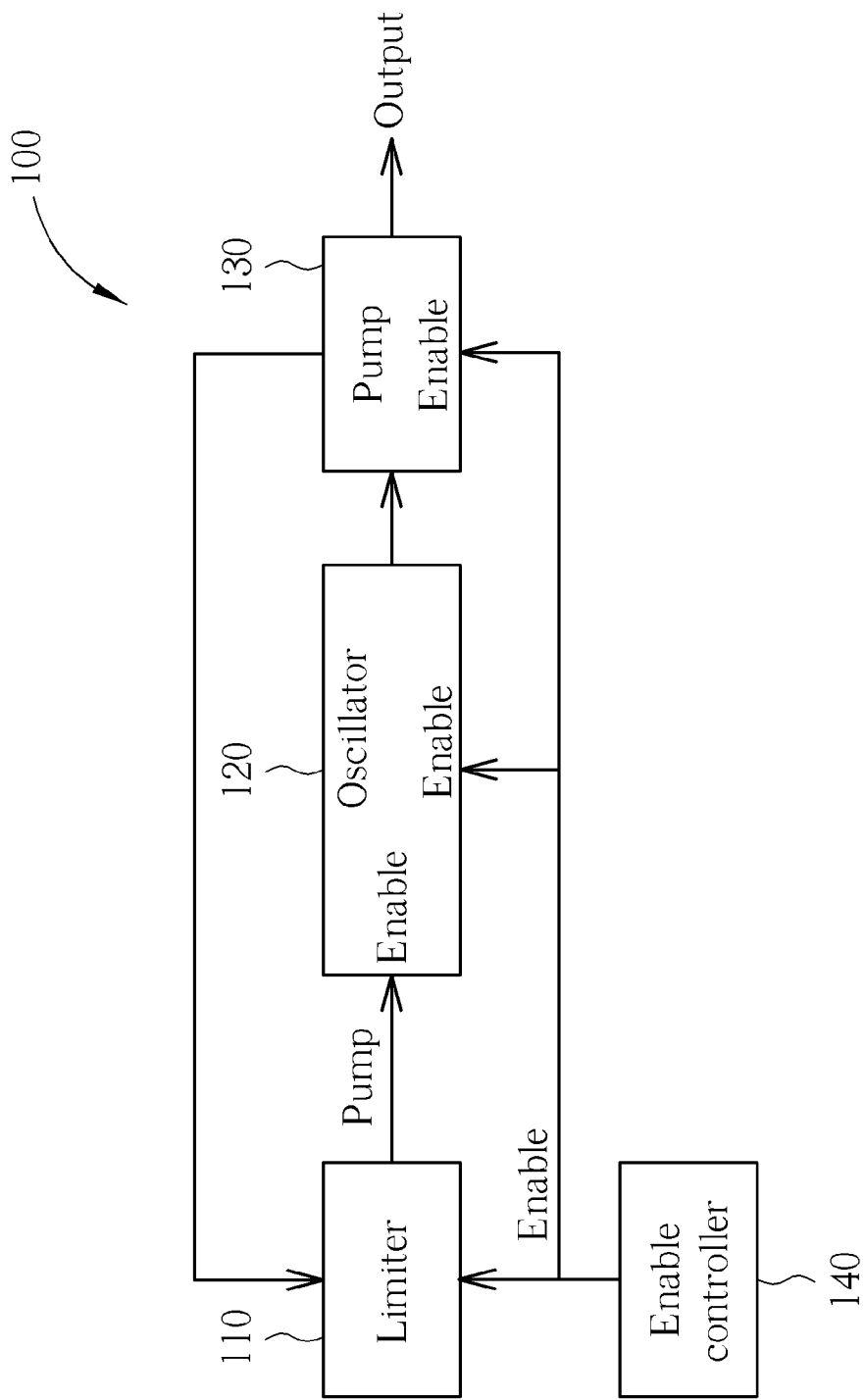
FIG. 1 is a diagram of a conventional pump system that employs an enable controller.
Figure 2:
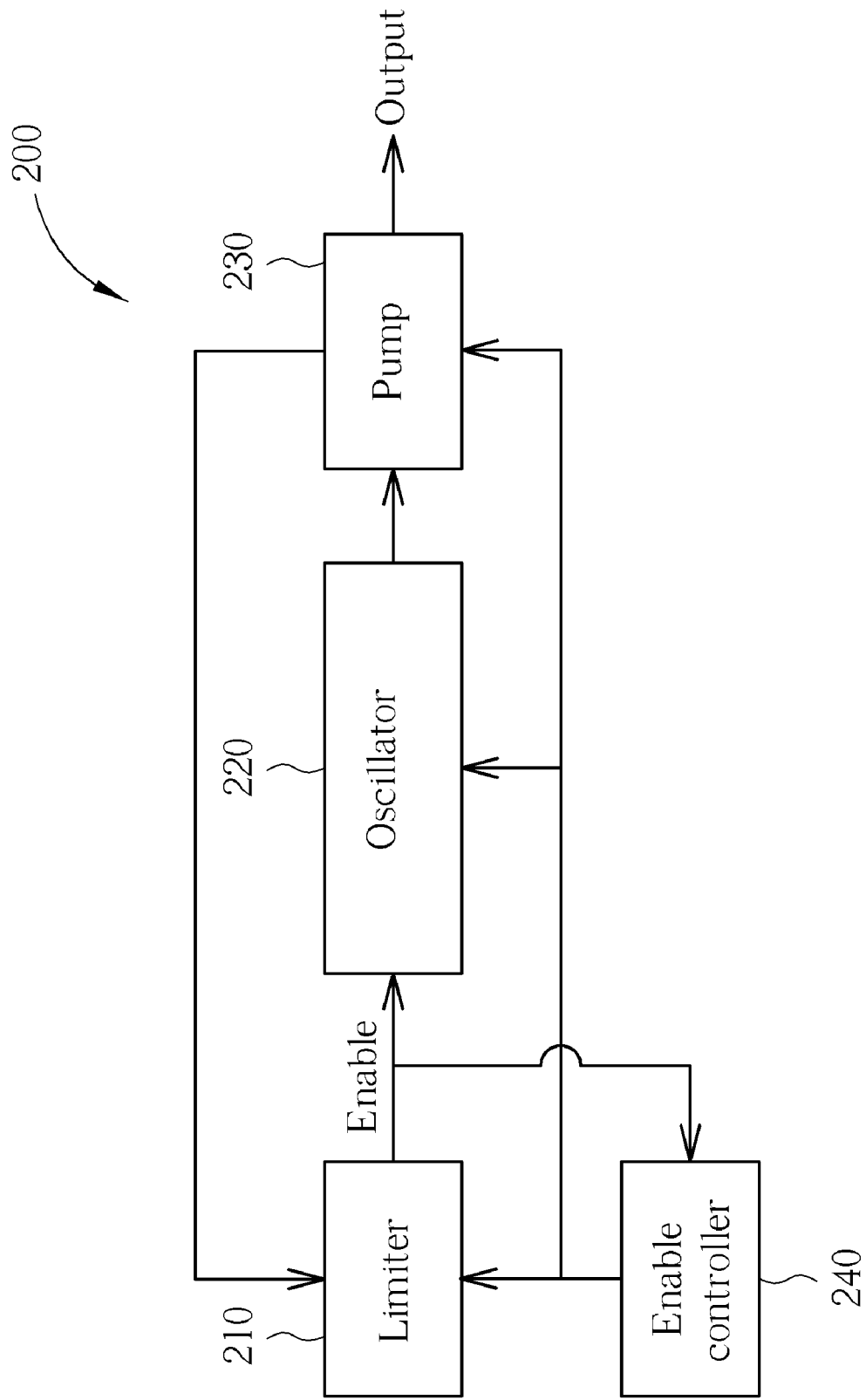
FIG. 2 is a diagram of a pump system according to an exemplary embodiment of the present invention.

Please refer to FIG. 2. FIG. 2 is a diagram of a pump system 200 according to an exemplary embodiment of the present invention. The pump system 200 comprises a limiter 210, an oscillator 220, a pump 230 and an enable controller 240. The pump enable signal output from the limiter 210 is input to the enable controller 240 as well as the oscillator 220.

The enable controller 240 will obtain a preliminary setting corresponding to the time period between an initial time and time that the pump 230 is enabled. This preliminary setting is then used to estimate a next time the pump 230 will need to be enabled. If the enable controller 240 enables the limiter 210 and the pump 230 does not need to be pumped until a time period t after the enabling (i.e. the limiter is enabled but does not output the enable signal until after a time period t), the enable controller 240 will add the amount t to the timer estimation period. If the enable controller 240 enables the limiter 210 and the pump 230 needs to be pumped immediately (i.e. the limiter immediately outputs the enable signal), then a certain amount of time x will be subtracted from the timer estimation period. In this case, as the amount of difference between the estimated time for pumping and the actual time for pumping cannot be accurately determined, x can be set to any reasonable value. This process repeats each time pumping occurs. In other words, the enable controller 240 is constantly being calibrated, thereby making estimation of a time for pumping more accurate.

Figure 3:
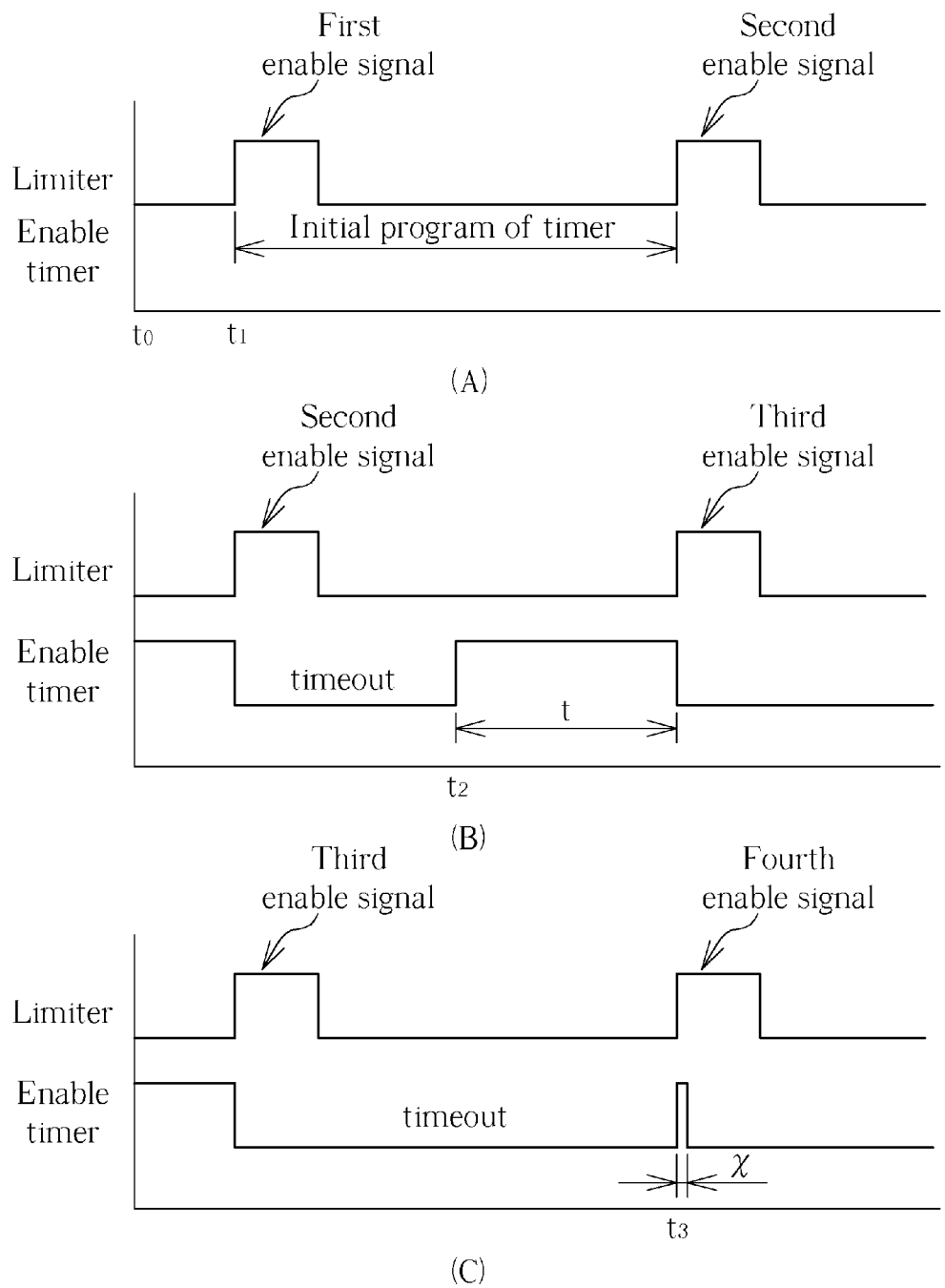
FIG. 3A is a diagram showing the initial estimation of a timer period of the enable controller shown in FIG. 2.
FIG. 3B is a diagram showing when the timer estimation period is too short.
FIG. 3C is a diagram showing when the timer estimation period is too long.

For an illustration of this method please refer to FIG. 3. FIG. 3 is a diagram of three graphs, annotated as FIG. 3A, FIG. 3B and FIG. 3C. FIG. 3A is a diagram showing the initial estimation of a timer period. FIG. 3B is a diagram showing when the timer estimation period is too short, and FIG. 3C is a diagram showing when the timer estimation period is too long.

As shown in FIG. 3A, the pump 230 is enabled at time $t_1$, and the time between pumping is utilized to set a value $t_{initial}$ for the enable controller 240. This value is set to the enable controller 240 as the initial program. In FIG. 3B, this initial program is shown to be too short. The enable controller 240 operates to enable the limiter 210 (and thereby the oscillator 220) at time $t_2$, but the pump 230 is not ready to pump yet, i.e. the limiter 210 does not output the enable signal. The pump 230 finally pumps at time $t_2+t$. The enable controller 240 therefore adds the period t to the timer estimation period. In FIG. 3C, the timer estimation period is now $t_{initial}+t$. When this period is reached, the limiter 210 immediately outputs the enable signal. This means that the pump 230 was ready to pump at a certain time before the limiter 210 was enabled. In FIG. 3C, this time is shown as time $t_3$, which is ahead of the timer estimation period by a value x. The enable controller 240 therefore subtracts the amount x from the timer estimation period. (As mentioned above, in this third case the amount of difference is unknown. The diagram shows the enable controller 240 subtracting the correct amount from the timer estimation period for simplicity). This process will continue each time pumping occurs, and the enable controller 240 is therefore dynamically calibrated.

The above method can also be applied to a regulator that has sourcing detection. Voltage regulators regulate output voltage in a system by sensing a current generated in components using a feedback mechanism. The sourcing detection may only need to be operable for certain periods of time, for example when a circuit is periodically charged to generate an output voltage. Therefore, the above method can also be applied to a voltage regulator circuit. When the sourcing detection is high (operable) the timer will utilize this value to estimate a next time that the sourcing detection will go high, and can dynamically calibrate these values according to observed results.

In summary, the present invention provides a means for dynamic calibration of a time a pump system needs to pump, or a regulator needs to provide sourcing detection. By only enabling components according to this calibrated time, considerable power can be conserved.

Those skilled in the art will readily observe that numerous modifications and alterations of the device and method may be made while retaining the teachings of the invention.

What is claimed is:

1. A voltage generation system that can dynamically calibrate a time period for enabling the system, comprising:
   a voltage generation circuit, for providing an output voltage;
   an oscillator, coupled to the voltage generation circuit, for driving the voltage generation circuit to generate the output voltage at a specific frequency according to an enable signal;
   a limiter, coupled to the oscillator and the output voltage fed back from the voltage generation circuit, for generating the enable signal to the oscillator according to the output voltage; and
   an enable controller, coupled to the limiter, the oscillator, the voltage generation circuit and the enable signal generated by the limiter, for sampling when the enable signal is generated by the limiter to estimate a time period between enable signals, enabling the limiter, the oscillator and the voltage generation circuit according to the estimated time period, and dynamically calibrating the estimated time period according to the sampling result.

2. The voltage generation system of claim 1, wherein the enable controller utilizes an initial time period between a first enable signal and a second enable signal as the estimated time period between enable signals, when a time period between the second enable signal and a third enable signal is greater than the estimated time period by a first amount, the enable controller will add the first amount to the estimated time period, and when a time period between the second enable signal and the third enable signal is less than the estimated time period by a second amount, the enable controller will subtract the second amount from the estimated time period.

3. The voltage generation system of claim 1, being a voltage regulator system, wherein the enable signal is a sourcing detection signal.

4. The voltage generation system of claim 1, being a pump system, wherein the voltage generation circuit is a pump and the enable signal is a pump enable signal.

5. A method for dynamically calibrating a time period for enabling a voltage generation system, the method comprising:
   generating an output voltage;
   periodically generating a first enable signal for driving the output voltage at a specific frequency according to a feedback signal of the output voltage;
   sampling when the first enable signal is generated to estimate a time period between first enable signals;
   generating a second enable signal according to the estimated time period
   outputting the first enable signal according to the second enable signal; and
   dynamically calibrating the estimated time period according to the sampling result each time the first enable signal is output.

6. The method of claim 5, wherein the step of dynamically calibrating the estimated time period each time the first enable signal is output comprises:
   when the second enable signal is generated and the first enable signal is output after a first period of time after generation of the second enable signal, the first period of time is added to the estimated time period; and
   when the second enable signal is generated and the first enable signal is immediately output, a second period of time is subtracted from the estimated time period.

7. The method of claim 6, wherein the second period of time can be determined by a user.

* * * * *